United States Patent [19]

Kulma

[11] 4,130,845

[45] Dec. 19, 1978

[54] DISC CABINET RECIRCULATING AIR FLOW SYSTEM

[75] Inventor: Clarence O. Kulma, Huntington Beach, Calif.

[73] Assignee: Microdata Corporation, Irvine, Calif.

[21] Appl. No.: 813,942

[22] Filed: Jul. 8, 1977

[51] Int. Cl.² .................. G11B 23/02; G11B 25/04; G11B 17/26; G11B 5/82

[52] U.S. Cl. ........................... 360/97; 346/137; 360/98; 360/133

[58] Field of Search ................... 360/97–99, 360/135, 86; 346/137; 206/444

[56] References Cited

U.S. PATENT DOCUMENTS

| | | | |
|---|---|---|---|
| 3,710,357 | 1/1973 | Buslik | 360/97 |
| 3,740,735 | 6/1973 | Gabor | 360/97 |
| 3,786,454 | 1/1974 | Lissner et al. | 360/98 |
| 3,812,534 | 5/1974 | Rousseau | 360/98 |
| 3,981,025 | 9/1976 | Schoettle et al. | 360/99 |
| 4,008,492 | 2/1977 | Elsing | 360/98 |
| 4,054,931 | 10/1977 | Bolton et al. | 360/97 |

*Primary Examiner*—Alfred H. Eddleman
*Attorney, Agent, or Firm*—Kleinberg, Morganstern, Scholnick & Mann

[57] ABSTRACT

An axially symmetrical, self-pressured air system has a substantially sealed enclosure for high speed rotating discs. Air admission to the enclosure is located such that pressures throughout the enclosure minimize the entrance of contaminants. A tangentially positioned chamber can be symmetrically arranged about a tangent in the cylindrical wall of the enclosure. Filters adjacent both the axial receiving means and the tangential chamber rid the enclosure of disc damaging impurities.

20 Claims, 5 Drawing Figures

DISC CABINET RECIRCULATING AIR FLOW SYSTEM

BACKGROUND OF THE INVENTION

1. Field of the Invention

The present invention relates to the field of magnetic disc enclosures and, more particularly, relates to air circulating systems for cooling and decontaminating air in the interior of such enclosures.

2. Description of the Prior Art

In high speed data processing systems, information is frequently recorded on magnetic discs for storage and rapid retrieval. Many of these discs are arranged axially with a plurality of similar discs attached to a common spindle. The spindles and the spindle mount drive the discs in rotation about the axis of the spindle. Such packages are frequently called storage files.

Such coaxial storage files are sealed within an enclosure. The enclosure frequently has generally cylindrical sides with a top and a bottom facing opposite sides of a circular disc. The generally cylindrical exterior frequently has a center coincidental with the spindle axis.

Magnetic heads mounted on a carriage are disposed within the enclosure for reading and writing digital bit information on the magnetic discs. Hereinafter is this description, the relationship of the present invention to magnetic disc files will be described.

The discs are rotated at high speed, frequently at approximately 3000 rounds per minute. Air inevitably begins a flow within the enclosure. The flow is generally in a spiral outward from the spindle or axis to the peripheral circumference of the magnetic discs themselves. One component of the air flow is radially outward from the axis. Friction between the spinning disc and the air immediately adjacent thereto is one cause of the flow. Impurities suspended in the air begin moving as the flow pattern develops within the enclosure. Such impurities have been known to interfere with the reading and writing of the information on the disc by obstructing the free motion of the magnetic head or by impairing the clearance between the head and the disc surface.

It has been known in the past to recirculate the enclosed air from the circumference or periphery of the disc. A filter within a recirculating plenum is designed to remove impurities and contaminants in order to increase the usable lifetime of the rotating drive assembly and to prevent interference with the writing and reading of the disc by the magnetic head.

In this regard, attention is directed to Buslik, U.S. Pat. No. 3,710,357, and Cuzner, et al., U.S. Pat. No. 3,849,800. These patents disclose air recirculated from outside of a magnetic disc through a filter and returned into the magnetic disc enclosure at a point somewhat offset from the axis. Also offset from the axis is another filter, a breather filter, which has the function of cleaning any air tending to enter the enclosure due to air temperature changes, or to replace air leaked from the cabinet. Such an off-axis breather filter most often results in a pressure differential across contaminant containing bearings that is unfortunately opposite that desired, when the air immediately inside the filter is at ambient pressure. This characteristic will be discussed in greater detail below. Such and similar arrangements have met with varying degrees of success, but certain problems remain when using them.

It has been found that having the breather filter offset from the axis of rotation allows the pressure to be much more negative relative to the outside ambient pressure at the axis than if the filter were located at that axis. The influence of such a negative pressure has the effect of drawing into the enclosure impurities from and through the axially positioned spindle bearings.

It is apparently impossible or impractical to completely seal the spindle bearings to prevent air flow through the bearings. The enclosure having such a negative pressure thus inevitably receives contaminants.

The air recirculation system, while being acceptable for single disc units, poses potential problems in multi-disc applications. The air entering the enclosure from the filter plenum is cleaner and possibly warmer or cooler than the average air in the enclosure.

In a multidisc system with the air recirculation below the bottom disc, axial contamination and temperature gradients can exist. Contamination gradients cause less protection for the heads and discs furthest from the recirculation system. Temperature gradients affect the accuracy with which the read-write heads can be positioned over a previously written track.

It is sought to provide an air recirculation system for magnetic disc enclosures which feeds the movement of contaminated air in an axially symmetrical fashion to a peripheral filtering arrangement. It is also sought to achieve a minimizing of the influx of new contaminants into to enclosure by proper pressure control utilizing as much of the necessary disc movements as possible.

SUMMARY OF THE INVENTION

In brief and in accordance with one aspect of the invention, multiple magnetic discs are assembled coaxially on a spindle which is driven by a disc drive means. The multiple disc assembly is encased in a substantially sealed cabinet or enclosure having a cylindrical side wall conforming over a significant portion of the enclosure to the periphery of the multiple disc assembly. A chamber disposed substantially tangential to the periphery of a cylindrical wall receives air driven radially from the center of the enclosure by the high speeds of the disc assembly.

The tangential chamber is adjacent a plenum having filtering means. Air enters the plenum from an opening on one side of the tangential chamber. This opening is situated such that it receives the high velocity air being driven tangentially and radially from the discs. The high velocity air is compressed at this point, causing a localized high pressure volume at this end of the plenum.

The other end of the plenum is connected by way of another opening to the other end of the tangential chamber. The configuration of the tangential chamber at this point is such that the high velocity air leaving the discs is caused to expand, creating a localized low pressure volume. This pressure differential at opposite ends of the plenum causes air flow through it. The air, as it is recirculated through the plenum, is filtered by filtering means.

The tangential chamber has an opening corresponding to the height of the stacked discs so that it receives high velocity air from each of the discs simultaneously and likewise returns filtered air to each.

A breather filter opening is located at the axis of rotation opposite the end where the spindle bearings are located at the discs rotate. Radial pressure gradients are generated with the lowest pressures being at the center of rotation. The relative magnitudes of the pressure gradients at the breather end and bearing end of the system, while somewhat independent, can be better controlled by adjusting the size of the air gap between rotating discs and stationary enclosure walls. Contaminants are kept from entering the enclosure through the bearings by keeping the bearing pressure slightly positive.

The novel features which are believed to be characteristic of the invention, both as to organization and method of operation, together with further objects and advantages thereof, will be better understood from the following description considered in connection with the accompanying drawings in which several preferred embodiments of the invention are illustrated by way of example. It is to be understood, however, that the drawings are for the purpose of illustration and description only and are not intended as a definition of the limits of the invention.

DESCRIPTION OF THE PREFERRED EMBODIMENT

Figure 1:
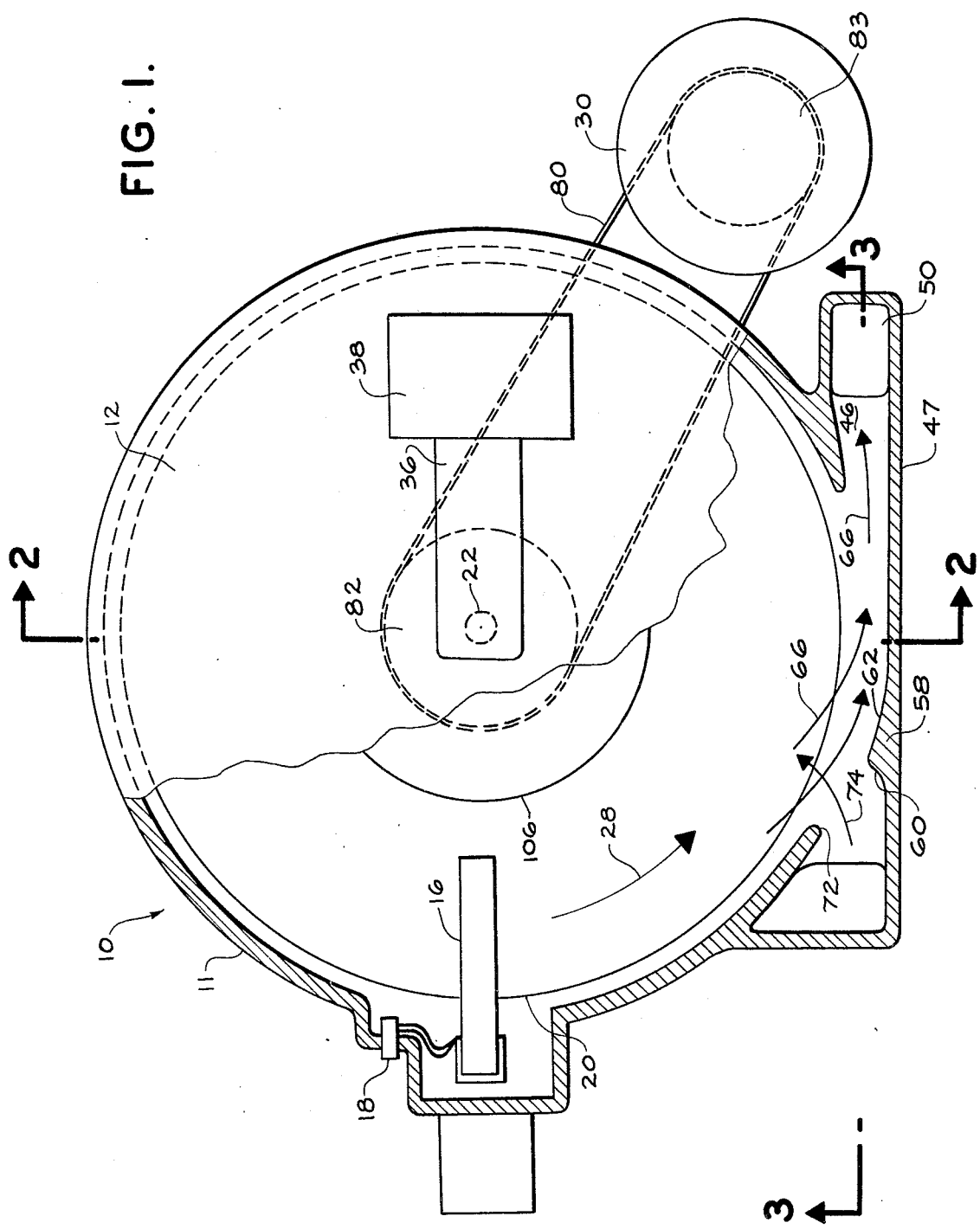
FIG. 1 represents a partially cut away, plan view of the preferred embodiment of the invention.

Turning first to FIG. 1, an enclosed cabinet 10 has a generally cylindrical side wall 11. The cabinet 10 has a circular top portion 12, shown partially cut away in FIG. 1 to better illustrate the relative positions of interior components. The cabinet 10 has a bottom, generally flat cover 14 (best seen in FIG. 2) to complete the enclosure. The top cover 12 and components mounted thereon may be removed for insertion of discs, as will be explained in greater detail below.

A writing and reading or pickup head 16 is mounted within the cabinet 10 to extend over rotating disc 20. The magnetic head 16 is connected to a terminal block 18 through the cabinet enclosure. Terminal block 18 can be connected to further data bit processing apparatus for processing the information read by the head 16.

Figure 2:
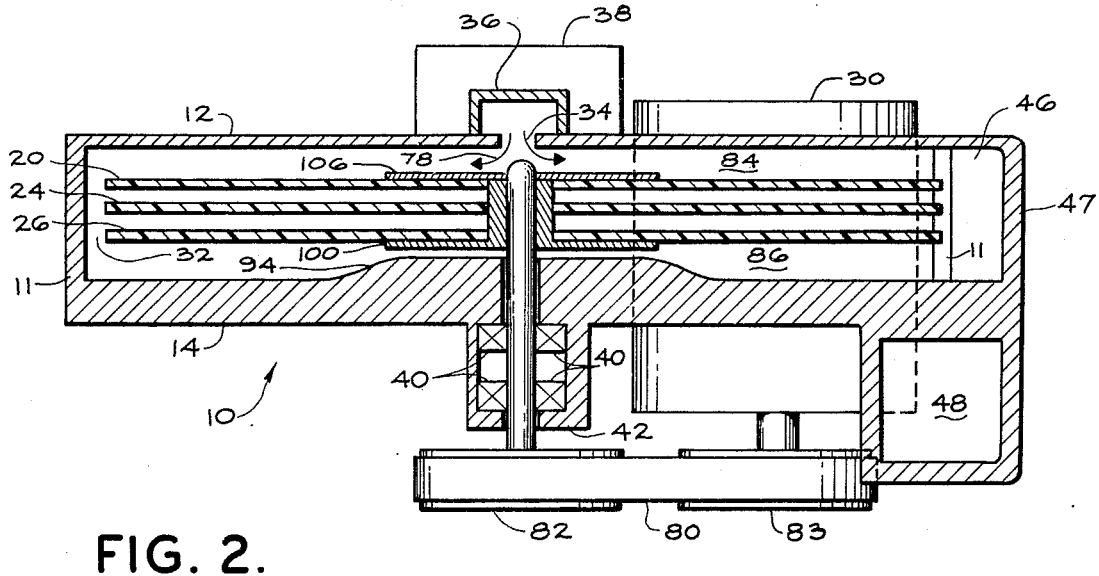
FIG. 2 represents an elevational, cross-sectional view of the invention as seen in the direction of the arrows along line 2—2 of FIG. 1.

As shown in FIG. 2, the magnetic disc 20 is mounted on a spindle 22. It is contemplated that the present invention may be used with a single disc or a plurality of coaxially mounted discs, such as discs 24 and 26 which are mounted on the same spindle 22. The discs are positioned to rotate in a counterclockwise manner as indicated by arrow 28 in FIG. 1. The spindle 22 is driven by drive means such as motor 30, shown in FIG. 2.

The cabinet structure 10 defines an interior 32. The interior 32 has the general shape of the interior of a cylinder except for circumferential recesses for mounting the magnetic heads 16 and for a tangential recirculating chamber explained in greater detail below.

The interior 32 communicates with a source of fluid, such as air, through an opening 34, which is concentric with the axis of spindle 22. A closed air conduit 36 conveys air from breather-filter 38 to the interior 32 through the opening 34. Breather filter 38 is adapted to receive and filter ambient air from outside the cabinet 10.

The spindle 22 passes through the bottom cover 14 and is journaled to the bottom cover 14 by bearings 40. The bearings 40 are supported by bearing mounts 42 which may include seals to restrict fluid flow through the bearings.

Formed tangentially to the cabinet 10 is a tangential chamber 46 having an outside wall 47 substantially recessed from the cylindrical wall 11. A portion of the cylindrical wall 11 is removed adjacent the tangential chamber 46 to create an opening from the cabinet interior 32 to the chamber 46.

A plenum 48 is positioned directly beneath the tangential chamber 46. A first conduit 50 connects the plenum 48 to receive air from the tangential chamber 46. A second conduit 52 provides an air return from the plenum 48 into the tangential chamber 46. Air flow in the tangential chamber 46 and in the plenum 48 will be explained in greater detail below.

An air recirculating filter 54 is positioned at the end of the plenum 48 adjacent the second conduit 52. The filter 54 should be an efficient, absolute particle filter. A particle filter capable of filtering air contaminants having a diameter of 0.3 micron or larger has been found to be satisfactory.

On the interior of outside wall 47 of the tangential chamber 46, a ramp 58 is formed. The ramp 58 has an end surface 60 which has some, though perhaps small, baffling effect on air flowing out of the second conduit 52 into the tangential chamber 46.

The inner surface 62 of ramp 58 is shaped having a radius of curvature similar to the radius of curvature of the cylindrical side wall 11. The inner surface 62 is further from the axis of spindle 22 than the interior side wall 11. The inner surface 62, therefore, may be thought of as complemental to the interior surface side wall 11 at least in the vicinity of the opening between the cabinet interior 32 and the tangential chamber 46.

In practice, a plurality of magnetic information discs 20, 24 and 26 are mounted on spindle 22 within the interior 32. The cover 12 is placed over the interior 32 to complete the enclosure of cabinet 10. Drive motor 30 is actuated to spin spindle 22 through a linkage including belt 80 and pulleys 82, 83 connected respectively to spindle 22 and the shaft of motor 30.

The magnetic discs 20, 24 and 26 are thus rotated in the direction of arrow 28 at relatively high speeds. Air adjacent the magnetic discs is "frictionally" engaged by the discs and through centrifugal force caused to flow in a spiral pattern outwardly toward the circumference of the discs 20, 24 and 26. The air pressure increases adjacent the cylindrical side wall 11 and decreases in the volume immediately adjacent spindle 22. The air in the increased pressure zones adjacent the cylindrical side wall 11 moves in a circular path counterclockwise in direction of arrow 28.

Figure 3:
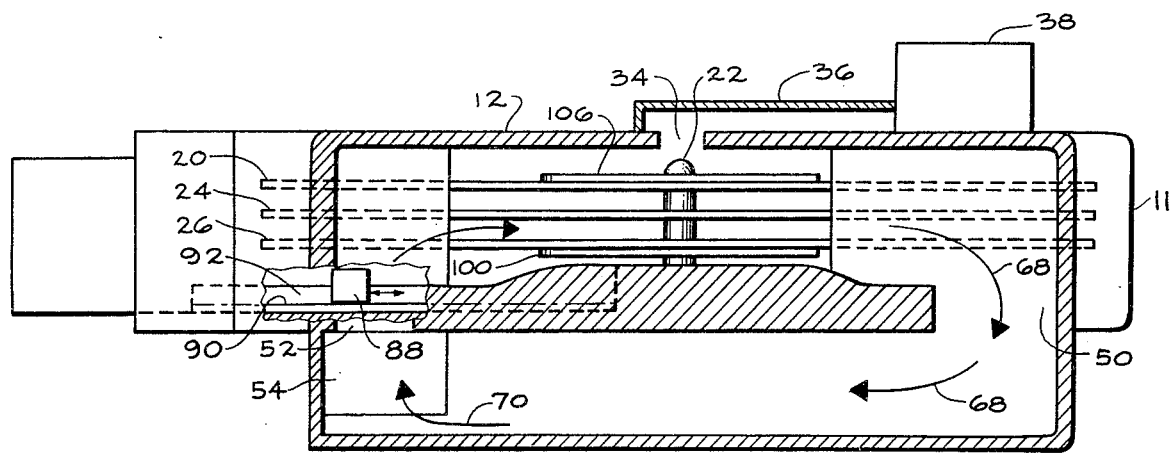
FIG. 3 represents a side elevational, partial cross-sectional view of the invention as seen in the direction of the arrows along line 3—3 of FIG. 1.

As the moving air, having increased pressure, approaches the opening to tangential chamber 46, the air volume expands in the direction of arrows 66. The air thus is directed and flows into the first conduit 50 and then into plenum 48. The air flow into plenum 48 is shown by arrows 68 in FIG. 3. The pressure caused by the flow of air in the first conduit 50 forces air through the recirculating air filter 54 and back into the enclosure as indicated by the arrows 70, 74 where the expansion of the air has resulted in a region of lowered pressure.

Some air will continue in the loop formed by the tangential chamber 46, first conduit 50, plenum 48, filter 54, and second conduit 52. Some of the air from the interior 32, however, by virtue of its high velocity, will flow past the edge 72 of the opening in the side wall 11 and force its way into the first conduit 50. The expansion of air past the edge 72 creates a localized low pressure area at this edge, drawing air from the second conduit 52 back into the cabinet interior 32 as indicated by the arrow 74.

A close estimate of the speed of air around the periphery of the interior 32 can be developed. The discs 20, 24, 26 frequently are operated at 3000 r.p.m. A disc having a seven-inch radius will have a tangential speed of approximately 183.25 feet per second. If it is assumed that the friction between the discs and the air surrounding the discs causes the air to have a velocity 80 percent of the discs, the air will have a velocity of approximately 146.6 feet per second.

Calculations based on an actual prototype indicate that air from the recirculating filter 54 exists into the chamber 46 with a velocity of approximately 1.8 feet per second. The differential factor of air velocities in the space slightly beyond (in relation to the tangential air speed) the edge 72 is of the order of 81.4. These calculations are given only to illustrate representatively the magnitude of air movement in one embodiment of the system. Lower air velocity differentials could achieve comparatively less but still beneficial results.

The formation of the ramp 58 should be made so as to have as small an effect of the turbulence of air in the interface opening between the tangential chamber 46 and interior 32 as may be possible. It has been discovered that too much turbulence in the air flow creates a negative pressure at the base of the spindle. This negative pressure tends to induce an air flow through the bearings 40. Since the air exterior to the bearings 40 as well as the bearings themselves contain contaminants, such additional contaminants could be introduced into the substantially closed system, and the recirculating air filter 54 is burdened further.

The present system having the tangential chamber 46 has been found to be more mild while effectively filtering contaminants from the interior 32. If the leeward side wall 62 of ramp 58 is gently curved, the turbulence caused by the expanding air moving in the direction of arrows 66 is reduced.

In an alternative embodiment, a fresh air intake breather system is provided. The air coming through the opening 34 is filtered by the breather filter 38, thus reducing the load on recirculating filter 54. The opening 34 communicates with the conduit 36, filter 38 and thus the ambient air. The structure of opening 34, the conduit 36, and the filter 38 is intended to maintain the air in the opening 34 at ambient pressure.

Since the opening 34 has a boundary coaxial with the axis of the spindle 22, the filter 38 permits clean air to be admitted through the top cover 12 opposite the point in the bottom cover 14 through which the spindle is inserted. The positioning of opening 34 is shown coaxial with the spindle 22 as illustrative of one embodiment of the breather filter system. The intake opening 34 may be located a predetermined amount off the center of spindle 22 with sufficiently beneficial result as will be explained more fully.

The space 86 between the uppermost disc 20 and the cover 12 first receives air in the direction of arrows 78 through the intake opening 34. The spinning of the disc 20 causes air to move with a radial component toward the periphery of the interior 32, causing an increased air pressure in the periphery. Since the air at the opening 34 is maintained substantially at ambient pressure, a pressure differential is established along the radius between the spindle 22 and the interior periphery.

Similarly, a pressure differential is established between the spindle 22 and the interior periphery in the radial direction relative to the disc 26 in the space 86 between the bottom cover 14 and the lowermost disc 26. Space 86 in cabinets in which the present invention is contemplated to be used, has certain operative elements which affect the radial pressure differential. For example, a read-write carriage head 88 mounted on a bearing-and-way system 90 is usually mounted in a depression 92 in floor 14, as illustrated in the cut away of FIG. 3. Additionally, a labyrinthine type "seal" 94 is usually provided adjacent the lower rim of the clamping arrangement 100. The labyrinthine type seal leaves a very small air space between the floor 14 and the clamping arrangement 100 in the space 86.

Other alterations are frequently formed in the floor 14 to provide for additional features which may be included in the cabinet structure when desired. Such an additional alteration, for example, might be a fixed head opening which would alter the contour of the interior face of the floor 14. The pressure differential between the interior periphery and the spindle 22 in the space 86, therefore, is substantially less than the radial pressure differential in space 84.

Since the pressure at the periphery of the interior 32 is substantially uniform, it can be seen that the pressure surrounding the spindle 22 in space 86 has a higher than ambient air pressure. This positive air pressure exerts an influence through the bearings 40 and bearing cover 42 arrangement to prevent contaminants from entering into the interior through the bearing system.

The hereinbefore described relationship between the air pressure around spindle 22 in space 86 and the ambient air has been found where the air space 86 is substantially equal to the air space 84. That is to say, the vertical dimension of air space 84 is substantially equal to the vertical dimension of air space 86. If the uppermost disc 20 is arranged closer to the top cover 12, an even greater pressure differential is found to exist between the periphery of the interior 32 and the air around the spindle 22 in the space 84. If the air space 86 remains constant while the air space 84 is decreased, the increased pressure differential along the radius in space 84 creates an even greater positive air pressure around the axle 22 in space 86, relative to the ambient air pressure.

If the opening 34 is positioned in the top cover 12 off centered from the axle 22, the pressure differential along the radius in space 84 is decreased. Such an off-center intake opening 34 in effect creates an ambient pressure ring within the space 84. The pressure differential caused by the rotating disc 20 forcing the air to the periphery in space 84 thus has a reduced radius along which to influence the air in the radial direction.

The reduced pressure differential found when placing the opening 34 off the axle center causes the air pressure around the spindle 22 in space 86 to decrease relative to the ambient pressure. The design of the interior 32 should be made, therefore, so that the positioning of the intake opening 34 and the relationship between the spaces 84, 86 is such as to leave a sufficient positive air pressure around spindle 22 in space 86, so as to prevent the inward flow of ambient air through the bearings 40 and bearing cover 42 arrangement.

If the intake opening 34 is moved off center, the distance between the uppermost disc 20 and the top cover 12 should be reduced to create an air space 84 substantially less than the air space 86. It has been found, however, that if the air spaces 84, 86 are equal and if the intake opening 34 is positioned coaxially with the spindle 22, a sufficient air pressure is established around the spindle 22 in space 86 to keep contaminants and air from flowing through the opening admitting the spindle 22 into the interior 32.

Figure 4:
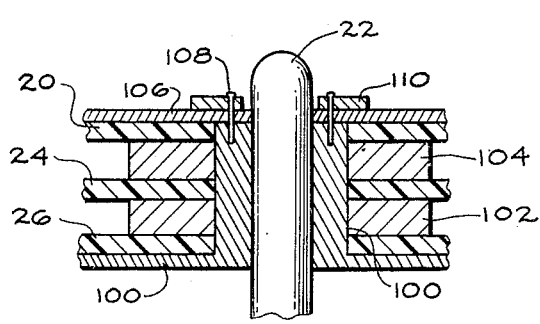
FIG. 4 is an enlarged detail of a spindle clamping arrangement showing certain embodiments of the invention.
Figure 5:
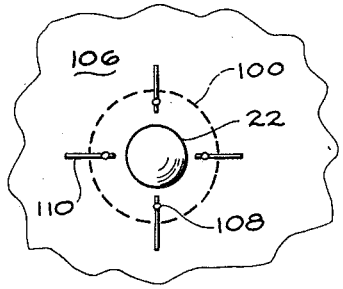
FIG. 5 is a plan view of the invention as seen in FIG. 4.

Additional means may be employed to maximize the air pressure differential between the intake opening 34 and the periphery of the interior 32. In FIG. 4, an enlarged detail of the clamping arrangement holding the discs 20, 24 and 26 to the spindle 22 is shown. A clamp 100 is arranged concentrically about the spindle 22. The clamp has an annular flange at its bottom. The lowermost disc 26 is placed on the lower flange. An annular spacer ring 102 is positioned concentrically with the clamp 100 to space the next disc 24 from the lower disc 26.

Additional spacers are placed to separate additional discs stacked onto the spindle 22. As shown, spacer 104 separates disc 24 from the uppermost disc 20. The upper flange 106 of the clamp 100 is then clamped on top of the disc 20. A pin 108 is inserted from the top through the flange 106 to secure it to clamp 100, and consequently the discs and spacers together on the spindle 22.

An air impeller blade 110 is positioned to extend into the air space 84 from the top surface of flange 106. It has been found that by placing such impeller blades in a radial orientation in the air space 84, an even greater radial air pressure differential will result when the disc and clamping arrangement 100 spins at high speeds. Such impeller blades then afford a designer greater freedom in designing the relationship between the top cover 12 and the disc 20.

Thus, if it is impossible to design the cabinet 10 so that space 84 is less than space 86, such as is the situation where the top disc 20 might be removed from a particular cabinet having standard, inalterable dimensions, the impeller blades 110 on the clamp 100 may cause a sufficient enough increase in the air pressure in space 84 to maintain the desired positive air pressure around the spindle 22 in space 86. Exterior design requirements, further, may dictate the positioning of the intake opening 34 at a location remote from the spin axis. Impeller blades 110 in such circumstances may afford a sufficient increase in radial air pressure in space 84 to maintain the desired pressure differential across the bearings 40.

There is thus described a disc cabinet enclosure air flow recirculating system having greatly improved air purifying capabilities. In actual tests, th air within the disc cabinet or enclosure has been found to be filtered to less than 50 particles of 0.3 micron or larger per cubic foot. This test was run using a Royco counter having a tube for sampling the air inserted into the chamber. Royco is a trademark of the Royco Instruments, Inc.; Menlo Park, Calif.

Although particular embodiments of the present invention have been described and illustrated herein, it is recognized that modifications and equivalents may readily occur to those skilled in the art. Consequently, it is intended that the claims may be interpreted to cover such modifications and equivalents and that the invention be limited only thereby.

What is claimed is:

1. An air pressure control system for a cabinet for rotatable discs, comprising:
    a disc cabinet having a generally cylindrical shaped interior wall defining an axis and partially defining a cabinet interior, the wall being adapted to surround at least one disc, and a top cover joined to said interior wall and a bottom cover joined to an opposite portion of said interior wall, wherein said top cover defines a first volume of space between the uppermost of said at least one disc and said top cover, and wherein said bottom cover defines a second volume of space between the lowermost of said at least one disc and said bottom cover;
    rotating means for rotatably mounting and spinning said at least one disc coaxially within said cylindrically shaped interior wall, said rotating means including a rotating means opening in said cabinet through which opening said rotating means may enter said interior; and
    air inlet means for admitting air from outside the cabinet into said interior, said air inlet means including an air inlet means opening positioned opposite said disc from said rotating means opening in said cabinet;
    wherein the ratio of said first volume to said second volume is predetermined to maintain air pressure in said interior adjacent said rotating means opening, higher than ambient air pressure when said at least one disc is rotated.

2. The control system of claim 1 wherein said air inlet means opening is circular and symmetrical about said axis.

3. The control system of claim 2 wherein said air inlet means further includes a breather filter positioned adjacent said air inlet means opening and is adapted to receive air from outside the cabinet, and wherein said air inlet means further includes a closed air conduit disposed between said breather filter and said air inlet means opening for conveying air from said breather filter to said air inlet means opening.

4. The air control system of claim 1 wherein said air inlet means opening has a center radially spaced from said interior wall axis, and wherein said rotating means includes air impeller blades radially aligned with said interior walled axis in proximity to said air inlet means opening, said blades being fixed in relation to said disc for rotation therewith.

5. The control system of claim 1 wherein said first volume equals said second volume, and said air inlet means opening comprises a generally circular opening coaxial with said interior wall axis.

6. The control system of claim 1 wherein said first volume is substantially less than said second volume, and said air inlet means opening has a center radially spaced from said interior wall axis.

7. The control system of claim 1 further comprising a closed air recirculating means for receiving air from and returning air to said interior, said recirculating means including air filter means for filtering contaminants from said received air before returning said air to said interior, said recirculating means including further a chamber having at least one chamber opening through said interior wall for said receiving and said returning said air, wherein said chamber opening extends a length along said axis sufficient to encompass any and all of said at least one disc.

8. The control system of claim 7 wherein said recirculating means chamber defines an interior wall having a greater distance from said axis than said substantially cylindrically shaped interior wall, and wherein air returning to said interior is so directed at a space where air received by said recirculating means is expanding from said interior.

9. The control system of claim 8 wherein said recirculating means further includes ramp means for directing air returning to said interior.

10. The control system of claim 9 wherein said recirculating means further includes a first air conduit conducting said air received, a plenum receiving air from said first air conduit, and a second air conduit connected to said plenum for returning air to the interior, and wherein said air filter means is disposed in said plenum.

11. The control system of claim 10 wherein said ramp means includes a baffle baffling air flowing through said second air conduit opening to said interior.

12. A recirculated air control system for a rotating disc cabinet, comprising:
(a) a disc cabinet having a generally cylindrically shaped interior wall having an axis and partially defining a cabinet interior adapted to enclose at least one disc mounted to spin on a spindle about said axis;
(b) an opening in said interior wall exposing the interior to a tangential chamber;
(c) a plenum chamber positioned adjacent said tangential chamber and adapted to receive from and to return to said tangential chamber, air from the interior;
(d) an inlet air conduit and an outlet air conduit connecting said tangential chamber and said plenum, said inlet and outlet air conduits having openings relative to the interior substantially equidistant from the point of tangency; and
(e) wall ramp means for creating a directed flow of the air expanding from the interior into the tangential chamber across the opening for said inlet air conduit.

13. The air control system of claim 12 wherein said opening extends for a height in said interior wall sufficient to extend both above and below all of said at least one disc.

14. The air control system of claim 12 further including air filter means disposed in said plenum and adapted to receive air in said plenum for filtering therefrom disc damaging impurities.

15. The air control system of claim 12 wherein the step means includes a ramp extended from a wall of said tangential chamber.

16. The air control system of claim 15 wherein said ramp is formed presenting a baffle to the air flowing through said outlet air conduit opening to said tangential chamber, and a side wall surface having a shape substantially complemental to and radially extending from said cylindrical wall.

17. The air control system in claim 12 further comprising air inlet means for admitting air from outside the cabinet into the interior.

18. The air control system of claim 17 wherein the air inlet means comprises a circular opening symmetrical about the spindle axis.

19. The air control system of claim 17 further including a breather filter positioned adjacent said air inlet means opening and adapted to receive air from outside the cabinet, and further including a closed air conduit disposed between said breather filter and said air inlet means for conveying air from said breather filter to said air inlet means.

20. The air control system of claim 19 wherein the air pressure in said air inlet means opening is maintained substantially at the ambient pressure of the air outside the cabinet.

* * * * *

UNITED STATES PATENT OFFICE
CERTIFICATE OF CORRECTION

Patent No. 4,130,845　　　　　　　　　Dated Dec. 19, 1978

Inventor(s) CLARENCE O. KULMA

It is certified that error appears in the above-identified patent and that said Letters Patent are hereby corrected as shown below:

Column 2, line 29, after "into" delete "to".

Column 2, line 67, after "located" change "at" to --as--.

Column 4, line 50, change "magentic" to --magnetic--.

Column 5, line 23, delete "exists" and insert --exits--.

Column 5, line 33, after "effect" change "of" to --on--.

Column 7, line 57, after "tests," change "th" to --the--.

Signed and Sealed this

Twenty-ninth Day of May 1979

[SEAL]

Attest:

RUTH C. MASON
*Attesting Officer*

DONALD W. BANNER
*Commissioner of Patents and Trademarks*